United States Patent Office.

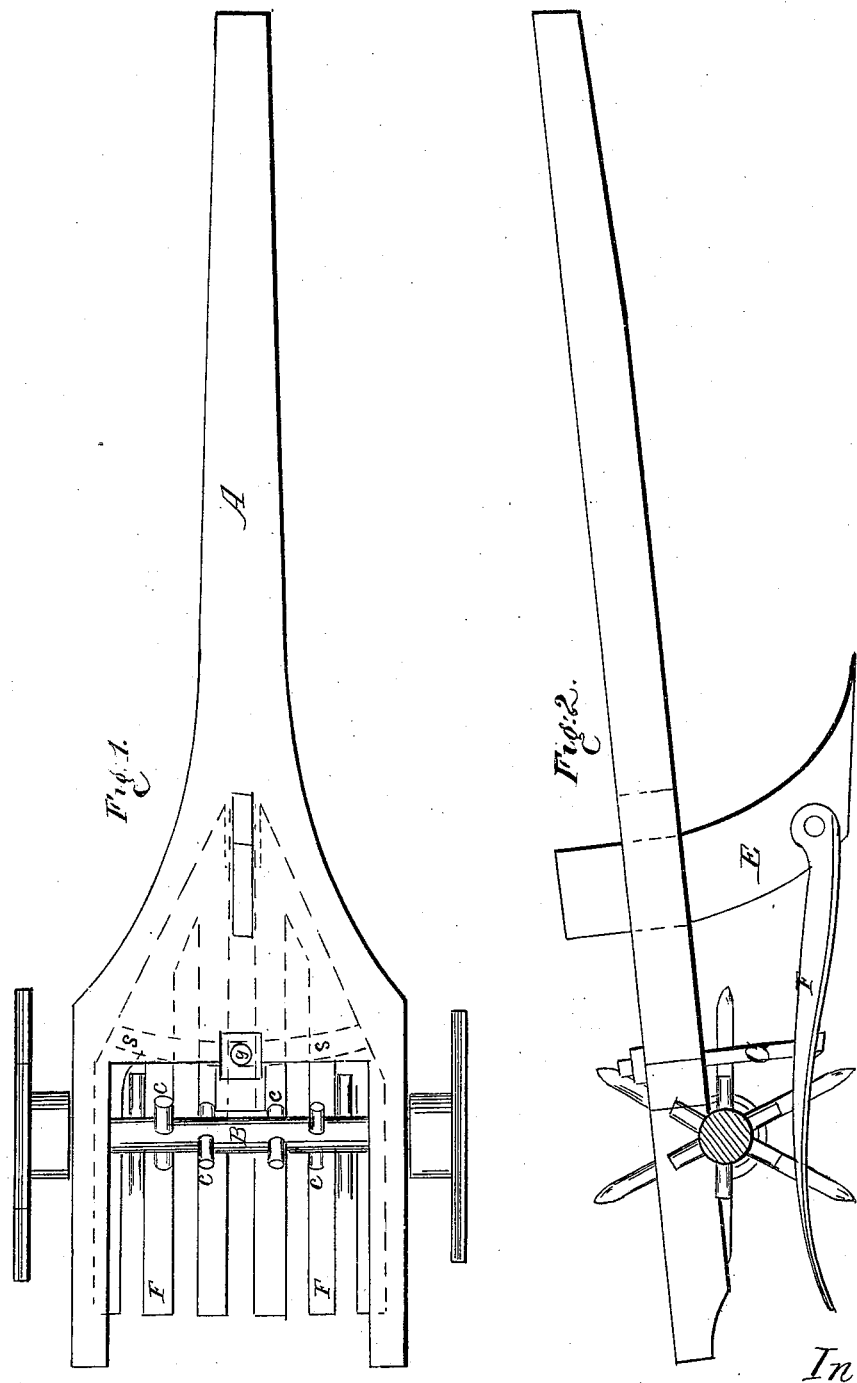

JOHN M. BURKE, OF DANSVILLE, NEW YORK.

Letters Patent No. 93,050, dated July 27, 1869.

IMPROVEMENT IN POTATO-DIGGER.

The Schedule referred to in these Letters Patent and making part of the same.

*To all whom it may concern:*

Be it known that I, JOHN M. BURKE, of Dansville, in the county of Livingston, and State of New York, have invented a new and valuable Improvement in Potato-Diggers; and I do hereby declare that the following is a full, clear, and exact description of the construction and operation of the same, reference being had to the annexed drawings, making a part of this specification, and to the letters and figures of reference marked thereon.

Figure 1 of the drawings is a top plan view of my invention.

Figure 2 is a side sectional view of the same.

My invention has relation to machines for digging potatoes; and

It consists mainly in the construction and novel arrangement of devices by which the work of digging potatoes may be readily and efficiently accomplished.

The letter A, of the drawings, represents the tongue of my potato-digger, which is made to extend to the extreme rear of the machine, and has its rear forked ends pointed, to serve as handles for the operator.

The letter B represents an axle working in journals formed by staples extending downward from the lower side of the tongue A. This axle is constructed with a series of pins marked c, which is firmly attached thereto, and which serves the purpose of shaking the grate F, as hereinafter mentioned.

The wheels of my machine consist of hubs and spikes, without felloes or tire, as represented.

The letter E represents the plow adjusted in the tongue, as shown, to the bottom part of which is pivoted the grate F.

The letter G is a bolt passing from the top of tongue A to the bottom of grate F, as shown, and is made adjustable by means of proper screws and nuts.

The grate F is a series of plates or fingers, rounded upward at its centre, pivoted, at its front end, to the plow E, and joined by the cross-bar s, which cross-bar also serves as a means for attaching the bolt G to the grate F.

To operate my device, the plow is drawn through the potato-hill, and the potatoes, with the soil, are necessarily passed rearward upon the grate F. While this is being done, the spike-wheels are rotated, and at every movement thereof, the pins c are forced against the fingers of grate F, thereby giving said grate a constant shaking motion, and relieving it from the soil. The potatoes are passed rearward, with the soil separated therefrom, ready for gathering and transportation from the field.

What I claim as my invention, and desire to secure by Letters Patent, is—

1. The above-described machine, for digging potatoes, and freeing them from dirt, at one continuous operation.

2. The pivoted grate F, in combination with the plow E, spike-wheels, axle, and pins, as described, constructed, arranged, and operating substantially as specified.

In testimony that I claim the above, I have hereunto subscribed my name, in the presence of two witnesses.

JOHN M. BURKE.

Witnesses:
JESSE B. PURSIE,
C. K. KERN.